United States Patent
Gneuss et al.

(10) Patent No.: US 12,459,184 B2
(45) Date of Patent: Nov. 4, 2025

(54) EXTRUDER SCREW FOR A MULTI-SCREW EXTRUDER

(71) Applicant: Gneuss GmbH, Bad Oeynhausen (DE)

(72) Inventors: Daniel Gneuss, Charlotte, NC (US); Detlef Gneuss, Carabietta (CH); Stephan Gneuss, Bad Oeynhausen (DE)

(73) Assignee: Gneuss GmbH, Bad Oeynhausen (DE)

(*) Notice: Subject to any disclaimer, the term of this patent is extended or adjusted under 35 U.S.C. 154(b) by 153 days.

(21) Appl. No.: 18/198,063

(22) Filed: May 16, 2023

(65) Prior Publication Data

US 2023/0278273 A1    Sep. 7, 2023

Related U.S. Application Data

(63) Continuation of application No. PCT/DE2021/100910, filed on Nov. 16, 2021.

(30) Foreign Application Priority Data

Nov. 17, 2020  (DE) ...................... 10 2020 130 368.8

(51) Int. Cl.
  *B29C 48/435* (2019.01)
  *B29B 7/48* (2006.01)
  (Continued)

(52) U.S. Cl.
  CPC ............ *B29C 48/435* (2019.02); *B29B 7/485* (2013.01); *B29B 7/489* (2013.01); *B29C 48/252* (2019.02); *B29C 48/38* (2019.02)

(58) Field of Classification Search
  CPC ..... B29C 48/435; B29C 48/252; B29C 48/38; B29B 7/485; B29B 7/489; B29B 7/488
  See application file for complete search history.

(56) References Cited

U.S. PATENT DOCUMENTS 3,642,397 A * 2/1972 Schippers ........... B29C 48/1472
  425/133.1
3,850,415 A * 11/1974 Hansen ................ B29C 48/501
  366/89

(Continued)

FOREIGN PATENT DOCUMENTS

CN   201086389 Y   7/2008
DE   102013003380 B3 *  4/2014 ............. B29B 7/485

(Continued)

OTHER PUBLICATIONS

IT-1167245-B (Year: 1987).*

(Continued)

*Primary Examiner* — Xiao S Zhao
*Assistant Examiner* — Guy F Mongelli
(74) *Attorney, Agent, or Firm* — Muncy, Geissler, Olds & Lowe, P.C.

(57) ABSTRACT

An extruder screw for a multi-screw extruder, having an intake and metering section. A rotor body has an enlarged diameter relative to the intake and metering section and has a plurality of satellite screws positioned on the outer periphery of the rotor body at least over part of the length thereof. A cone and an adjoining drive zone are formed between the intake and metering section and the rotor body, in which drive zone the satellite screws each engage via a drive pinion in an external toothing on the rotor body or in an internal toothing on a stator ring or in the inner wall of an extruder housing. At least one peripherally closed flow channel is formed, which flow channel extends from an inlet opening on the cone to an outlet opening located downstream of the drive pinions in the direction of flow.

10 Claims, 4 Drawing Sheets

(51) Int. Cl.
 *B29C 48/25* (2019.01)
 *B29C 48/38* (2019.01)

(56) References Cited

U.S. PATENT DOCUMENTS

| | | |
|---|---|---|
| 7,513,677 B2 | 4/2009 | Gneuss et al. |
| 9,061,442 B2 | 6/2015 | Gneuss et al. |
| 11,141,903 B2 | 10/2021 | Gneuss et al. |
| 2003/0012077 A1* | 1/2003 | Behling .................... B29B 7/60 366/85 |
| 2003/0128623 A1* | 7/2003 | Leveque ................. B29C 48/56 366/81 |
| 2015/0069652 A1* | 3/2015 | Clark .................. B29B 17/0412 264/143 |
| 2021/0283814 A1* | 9/2021 | Gneuss .................... B29C 48/44 |
| 2021/0283817 A1 | 9/2021 | Gneuss et al. |

FOREIGN PATENT DOCUMENTS

| | | | |
|---|---|---|---|
| DE | 102017111275 A1 | 11/2018 | |
| DE | 102018130102 A1 | 5/2020 | |
| IT | 1167245 B * | 5/1987 | ......... B29C 47/0801 |
| WO | WO03033240 A1 | 4/2003 | |
| WO | WO2020099684 A1 | 5/2020 | |

OTHER PUBLICATIONS

DE-102013003380-B3 (Year: 2013).*
International Search Report dated Mar. 28, 2022 in corresponding application PCT/DE2021/100910.

* cited by examiner

EXTRUDER SCREW FOR A MULTI-SCREW EXTRUDER

This nonprovisional application is a continuation of International Application No PCT/DE2021/100910, which was filed on Nov. 16, 2021, and which claims priority to German Patent Application No 10 2020 130 368.8, which was filed in Germany on Nov. 17, 2020, and which are both herein incorporated by reference.

BACKGROUND OF THE INVENTION

Field of the Invention

The invention relates to an extruder screw for a multi-screw extruder.

Description of the Background Art

For the processing of plastic melt, in particular polyester, a multi-rotation system (MRS) has proven to be successful, which is fundamentally described in WO 2003 033 240 A1, which corresponds to U.S. Pat. No. 7,513,677, which is incorporated herein by reference. It contains an extruder screw, which comprises a so-called polyrotation unit with a rotor body shaft between an input zone for drawing in and melting the plastic and a discharge zone. The latter has a significantly larger diameter as compared to the other zones and also several rotating satellite screws. With the multi-rotation system, a significant increase in degassing performance is achieved as compared to single and twin screw systems. Consequently, the residence time of the melt in the polyrotation unit can be kept very short. The well-known drive concept provides a drive zone for the satellite screws, which is located within the processing chamber intended for degassing. The melt transferred from the metering zone is passed through the drive zone. In some applications, the energy input resulting from the shear occurring there can be advantageous because it favors the homogenization of the plastic melt.

On the other hand, in the conventional art, a shear of the polymer in the drive zone can be disadvantageous for product properties.

SUMMARY OF THE INVENTION

It is therefore an object of the present invention to provide an extruder screw for an MRS system or a multi-screw extruder equipped with it in such a way that the polymer processed with it is less affected by shear.

According to an exemplary embodiment of the invention, a substantial proportion of the melt flow in the drive zone is not guided by the drive pinions by which the satellite screws are driven, but in closed flow channels which are formed within a support bearing element for the satellite screws and pass by the drive pinions. This provides the advantage of the melt not being heated by shear. It is advantageous, for example, in the processing of polyester (PET) if the melt is not completely plasticized and is therefore relatively cool in order to avoid excessive degradation of the melt already in the input section.

For the extruder screw itself, a further advantage is that the risk of damage to it is reduced in the event of contamination of the melt. The screws can be mounted in plain bearing bushings in front of and behind the drive pinion. The bearing prevents the tooth heads of the drive pinions from coming into contact with the bottom of the grooves of the support bearing element. This avoids possible wear and tear.

For the effectiveness of the flow channels, it is important that they are chosen to be large enough so that a large proportion of the volume flow of polymer conveyed and processed with the extruder screw is not routed through the drive zone. A sufficient cross-section is also important to prevent non-fully plasticized material of the feed screw from clogging the channels and leading to a high pressure drop. Both cause a high head pressure at the end of the feed and thus a significantly higher energy input and thus cause damage to the melt.

Specifically, the channels should provide at least 5 mm of free cross-section in each dimension, preferably 8 mm to 10 mm.

A second solution of the invention is that the flow channels can be routed externally around the toothing, i.e., they are inserted into the wall of the extruder housing and/or into the stator ring.

The annular gap between the outside of the support bearing element and the inside of the extruder hole in the housing should have a radial width of preferably 1 mm to 3 mm and a maximum of 5 mm. For example, with a diameter of 130 mm, the annular gap is designed to be 1.6 mm to 2.0 mm.

Preferably, the geometry can be such that an annular gap is formed between the outer periphery of the extruder screw in the drive zone and the inner periphery of the extruder bore, the cross-sectional area of which is a maximum of 20% of the sum of all cross-sectional areas of the flow channels. This means that by far the largest proportion is routed past the drive pinions via the flow channels.

This specifies that only a small volume flow flows over the outer periphery so that the polymer can act as a lubricant in the drive zone, while the larger proportion of the volume flow is divided among the flow channels and thus does not experience any shear in the drive zone. It is also advantageous if the size of the annular gap is so small that foreign bodies are retained in the melt flow that are of a size that can cause significant mechanical damage to the toothing.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
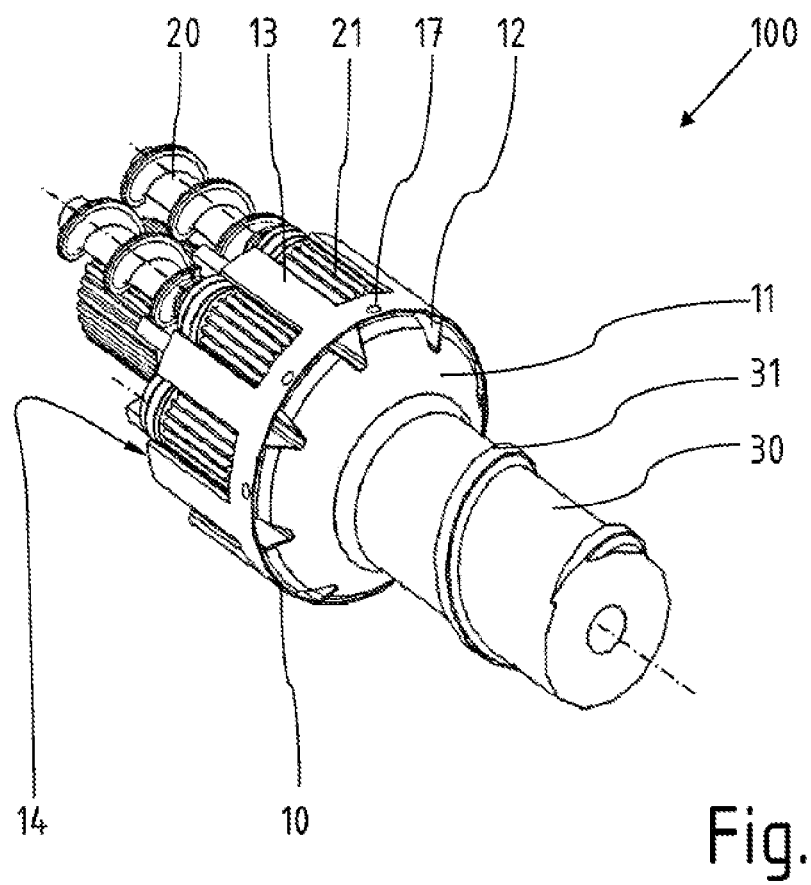
FIG. 1 shows parts of an extruder screw in a perspective view.

In FIG. 1, parts of an extruder screw 100 for a multi-screw extruder are shown in perspective, namely the transition area between an intake and metering section 30 with a screw web 31 and a multi-screw section with several satellite screws 20. In between, a cone 11 is formed, on which the diameter of the extruder screw expands in the direction of flow. The cone 11 is part of a support bearing element 10. In this, the end sections of several satellite screws 20, each equipped with a drive pinion 21, are mounted. An elongated, axial section of the support bearing element 10 is provided between adjacent drive pinions 21, in which a tubular flow channel 13 is formed that is closed at the periphery. The flow channel 13 extends from an inlet opening 12 on the cone 11 to an outlet opening 14, which is arranged beyond the drive pinion 21 as seen in axial extension of the extruder screw.

Figure 2:
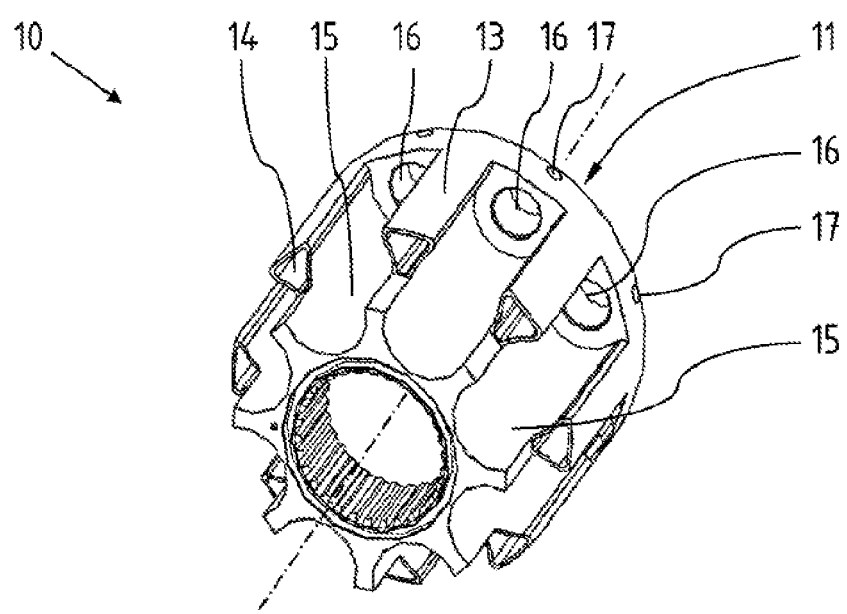
FIG. 2 is a perspective view of the satellite screw support element.

FIG. 2 is a perspective view of the support bearing element 10 seen from the rear. This has a groove 15 for each satellite screw, in which the drive pinion is mounted, and a bearing holder 16 in front of the head, into which a bearing shoulder of the satellite screw or the drive pinion can be inserted. The lubrication of the bearing of the satellite screws as well as the drive pinion is carried out by the molten polymer conveyed with the extruder screw. Since the bearing holders 16 are shielded from the flow by the rear cone 11, bores 17 are provided, each of which extends into the bearing holder 16.

In FIG. 2, a triangular or trapezoidal cross-section of the tubular flow channels 13 is clearly visible. The fact that the tip of the triangular cross-sectional surface or the narrow side of the trapezoid points to the central axis and that the wide base of the triangle lies on the outer periphery means that the space between the grooves 15 for the drive pinions is optimally utilized. The outlet openings 14 of the flow channels 13 are not located at the end of the support bearing element 10; rather, the flow channels 13 extend axially only about as far as the drive pinions reach.

Figure 3:
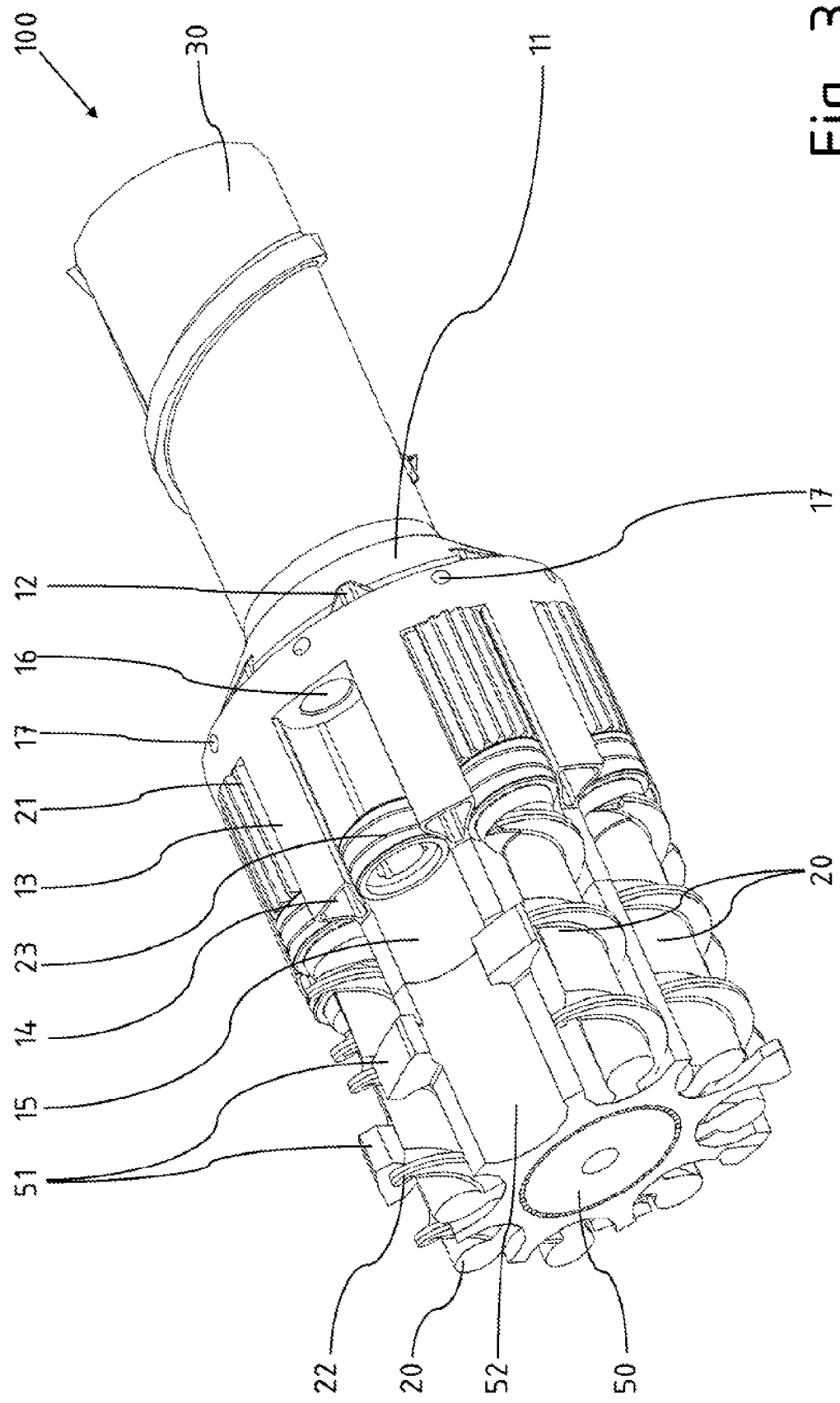
FIG. 3 shows parts of the extruder screw in a perspective view.

The advantage of this arrangement is shown in FIG. 3. There, the extruder screw with the intake and metering section 30, the satellite screw support element 10 and the satellite screws 20 is shown in perspective. In addition, a part of a rotor body 50 is shown, which adjoins the satellite screw support element 10. In real terms, the rotor body 50 is much longer than shown and extends over the entire length of the satellite screws 20. The grooves 15 of the support bearing element 10 each continue in the grooves 52 on the rotor body 50, which have the same cross-section. The satellite screws 20 are guided in it, with the outside exposed. The rotor body 50 has parts of its own main screw web 51 between the grooves 52. Due to the fact that the outlet openings 14 do not extend to the end of the support bearing element 10, the melt oozing out of the outlet opening 14 reaches directly laterally into the intake section of the webs 22 on the satellite screws and the main screw web 51.

Figure 4:
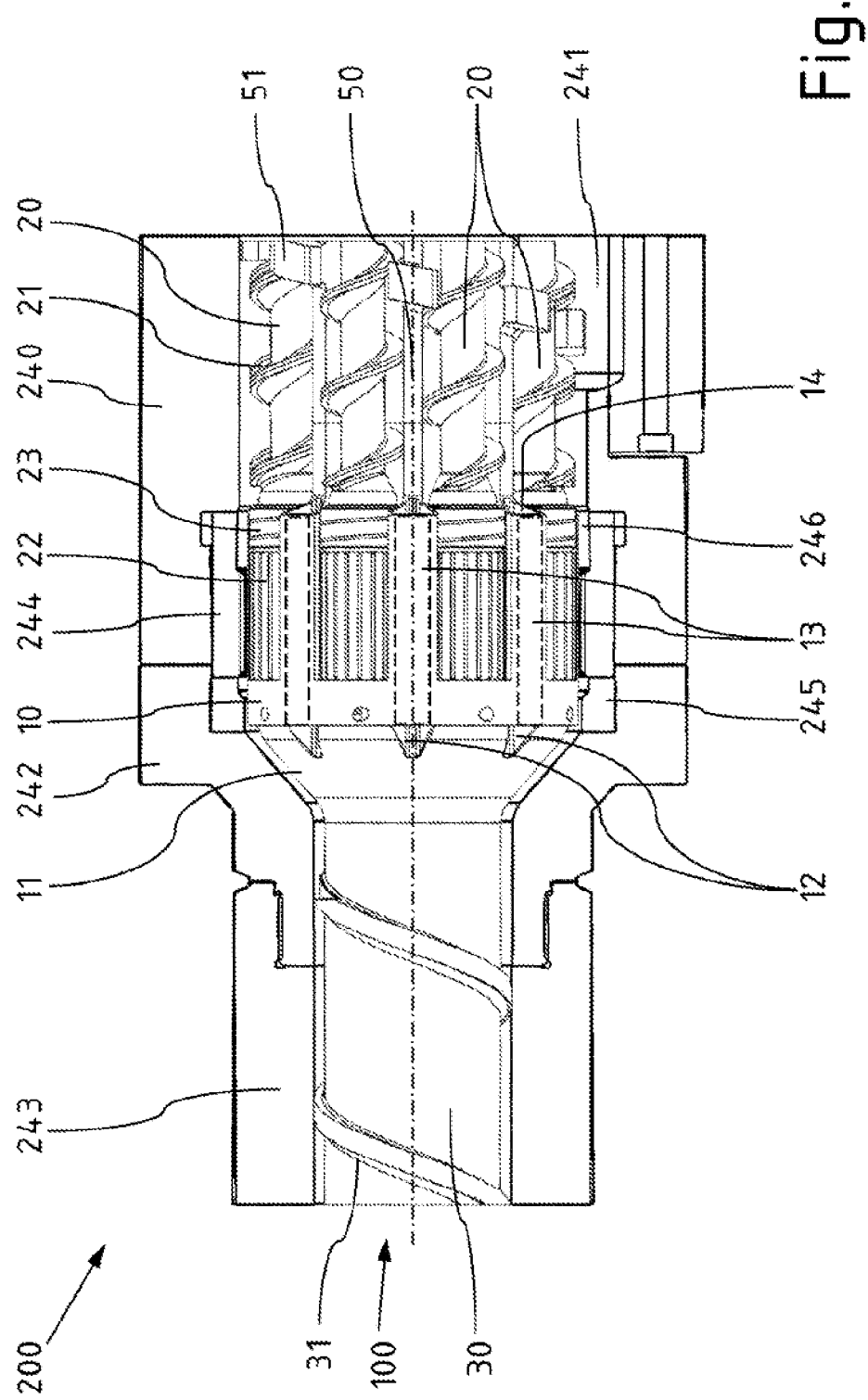
FIG. 4 shows parts of a multi-screw extruder in a lateral section view.

FIG. 4 shows parts of a multi-screw extruder in lateral sectional view. Shown is the same section of the extruder screw shaft 100 as shown in FIG. 3, which is rotatably mounted in an extruder housing 240 with an extruder bore 241. The extruder housing 240 comprises a housing part 242 to accommodate the cone 11 and a housing part 243 with a reduced diameter to accommodate the intake and metering section 30 of the extruder screw 100.

In the drive zone, a stator ring 244 is inserted into the extruder bore 241, which has an internal toothing into which the drive pinions 21 of the satellite screws 20 engage. In addition, a retaining ring 245 is used to limit the annular gap between the inner wall of the housing and the outer periphery of the extruder screw 100 at this point and to be able to adjust its width.

Figure 5:
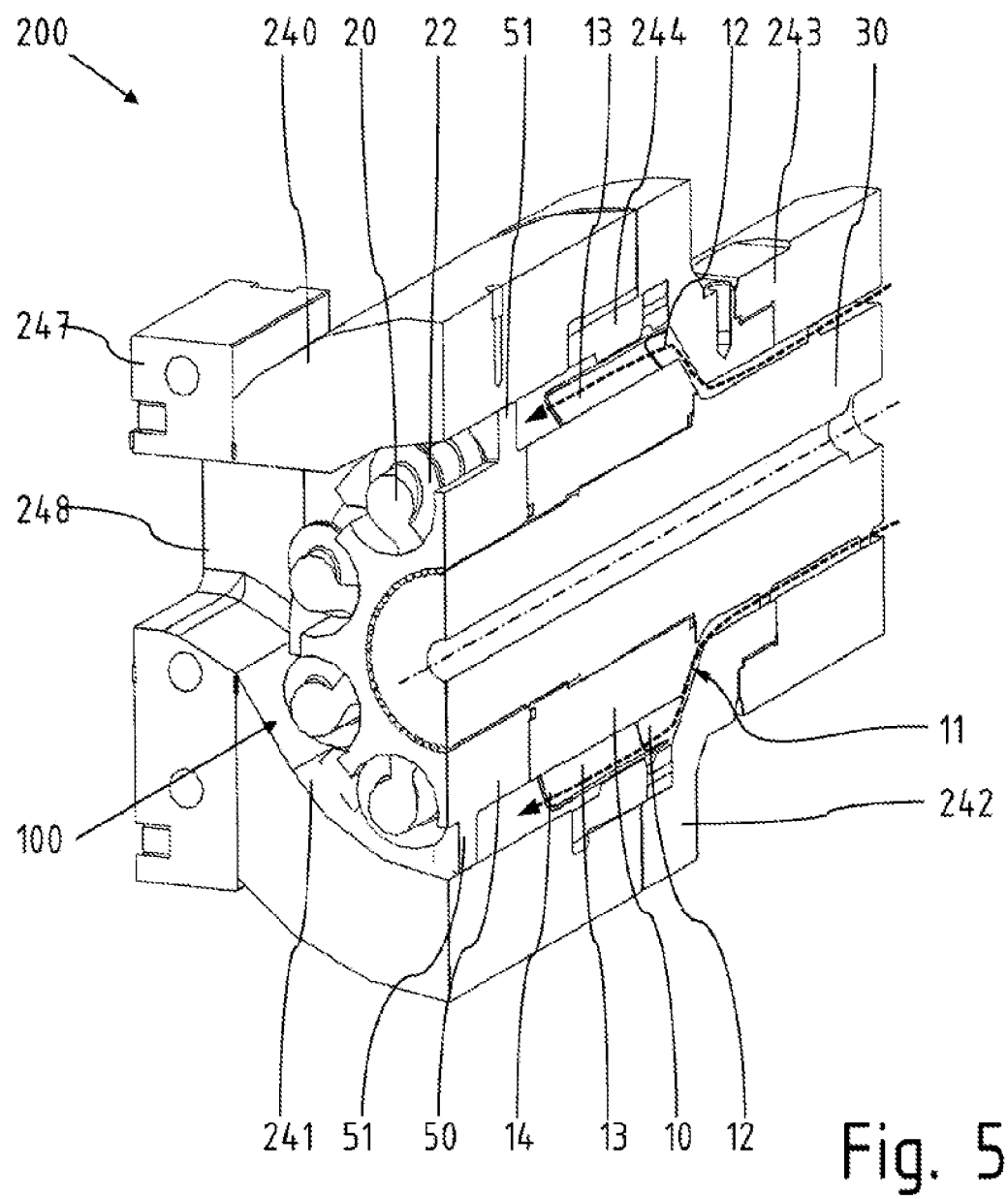
FIG. 5 shows parts of the multi-screw extruder in a perspective sectional view.

FIG. 5 shows the multi-screw extruder 200 again in a perspective sectional view. It is designed as a degassing extruder. Therefore, in addition to the other housing parts 242, 243, the extruder housing 240 also includes a connection flange 247, which contains an extraction opening 248. The extraction opening 248 is arranged right at the beginning of the main screw web 51 of the extruder screw shaft 100, i.e., the plastic melt can already be degassed after fanning out at the cone 11. Further extraction openings can be connected downstream.

The path of the plastic melt from the intake and metering section 30 via the cone 11 through the flow channels 13 is marked by the dashed arrow line. It can be seen that a large part of the plastic melt thus flows past the stator ring 244 with the toothing into which the drive pinions of the satellite screws 20, which are not visible here, engage.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An extruder screw for a multi-screw extruder, the extruder screw comprising:
   an intake and metering section;
   a rotor body having an enlarger diameter relative to the intake and metering section;
   a plurality of satellite screws positioned in an exposed manner on an outer periphery of the rotor body at least over part of the length thereof;
   a cone and an adjoining drive zone formed between the intake and metering section and the rotor body, in which the drive zone and the satellite screws each engage via a drive pinion in an external toothing on the rotor body or in an internal toothing on a stator ring or in an inner wall of an extruder housing of the multi-screw extruder; and
   at least one peripherally closed flow channel formed between that least two adjacent grooves for the drive pinions, whose flow channel extends from an inlet opening on the cone to an outlet opening located downstream of the drive pinons in a direction of flow, wherein the outlet opening is arranged downstream the drive pinions; and
   wherein the flow channels are tubular with a triangular or trapezoidal cross-section over at least part the length thereof, and wherein in the cross-section one apex of the triangle or narrow side of the trapezoid points to the central axis of the support bearing element and the opposite base is located on the outer periphery of the support bearing element.

2. The extruder screw according to claim 1, wherein the drive zone is formed on a support bearing element which, for each satellite screw, has a groove to accommodate the drive pinion and/or an opening to accommodate a bearing shoulder or bearing attached to the end of the satellite screw.

3. The extruder screw according to claim 2, wherein at least one radial bore is inserted on the outer periphery of the support bearing element per satellite screw, which bore extends into the groove for the drive pinion or into the bearing holder.

4. A multi-screw extruder comprising at least an extruder housing with an extruder bore in which the extruder screw according to claim 1 is rotatably mounted.

5. A multi-screw extruder comprising:
   an extruder housing with an extruder bore;
   an extruder screw rotatably mounted in the extruder bore with an intake and metering section;
   a rotor body which has an enlarged diameter relative to the intake and metering section, which has a plurality of satellite screws positioned in an exposed manner on the outer periphery of the rotor body at least over part of the length thereof;
   a cone and an adjoining drive zone are formed between the intake and metering section and the rotor body, in which the drive zone and the satellite screws each engage via a drive pinion in an internal toothing on a stator ring or in the inner wall of the housing;
   at least one flow channel formed in a housing wall in area of the drive zone between at least two adjacent drive pinions, the flow channel extending in a longitudinal direction from an inlet opening located in front of the internal toothing and an outlet opening located downstream the drive pinions; and
   wherein the flow channels are tubular with a triangular or trapezoidal cross-section over at least part the length thereof, and wherein in the cross-section one apex of the triangle or narrow side of the trapezoid points to the central axis of the support bearing element and the opposite base is located on the outer periphery of the support bearing element.

6. The multi-screw extruder according to claim 5, wherein the flow channels are formed in the stator ring and/or in a retaining ring inserted into the extruder bore in the drive zone.

7. The multi-screw extruder according to claim 5, wherein an annular gap is formed between the outer periphery of the extruder screw in the drive zone and the inner periphery of the extruder bore, a radial width of which is up to 5 mm.

8. The multi-screw extruder according to claim 5, wherein an annular gap is formed between the outer periphery of the extruder screw in the drive zone and the inner periphery of the extruder bore, a cross-sectional area of which is not more than 20% of the sum of all cross-sectional areas of the flow channels.

9. The multi-screw extruder according to claim 5, wherein the internal toothing is formed on a stator ring inserted into the extruder bore in the drive zone, and wherein a retaining ring limiting the annular gap is mounted in the longitudinal direction in front of the stator ring.

10. An extruder screw for a multi-screw extruder, the extruder screw comprising:
    an intake and metering section;
    a rotor body having an enlarged diameter relative to the intake and metering section, a plurality of satellite screws positioned in an exposed manner on an outer periphery of the rotor body at least over part of the length thereof;
    a cone and an adjoining drive zone formed between the intake and metering and the rotor body, in which the drive zone and the satellite screws each engage via a drive pinion in an external toothing on the rotor body or in an internal toothing on a stator ring or in an inner wall of the extruder housing of the multi-screw extruder;
    at least one peripherally closed flow channel formed between at least two adjacent grooves for the drive pinions, whose flow channels have triangular or trapezoidal cross-sections, wherein tips of the triangular cross-sections or narrow sides of the trapezoidal cross-sections point to a central axis or that the wide base of the triangular cross-sections lie on the outer periphery; and
    wherein the flow channels are tubular with a triangular or trapezoidal cross-section over at least part the length thereof, and wherein in the cross-section one apex of the triangle or narrow side of the trapezoid points to the central axis of the support bearing element and the opposite base is located on the outer periphery of the support bearing element.

\* \* \* \* \*